US012418808B2

(12) United States Patent
Li et al.

(10) Patent No.: US 12,418,808 B2
(45) Date of Patent: Sep. 16, 2025

(54) GRADIENT DATASET AWARE CONFIGURATION FOR OVER-THE-AIR (OTA) MODEL AGGREGATION IN FEDERATED LEARNING

(71) Applicant: QUALCOMM Incorporated, San Diego, CA (US)

(72) Inventors: Qiaoyu Li, Beijing (CN); Hao Xu, Beijing (CN); Liangming Wu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 18/030,261

(22) PCT Filed: Dec. 14, 2020

(86) PCT No.: PCT/CN2020/136041
§ 371 (c)(1),
(2) Date: Apr. 4, 2023

(87) PCT Pub. No.: WO2022/126307
PCT Pub. Date: Jun. 23, 2022

(65) Prior Publication Data
US 2023/0413070 A1    Dec. 21, 2023

(51) Int. Cl.
*H04L 41/16* (2022.01)
*G06N 3/098* (2023.01)
(Continued)

(52) U.S. Cl.
CPC ............ *H04W 24/02* (2013.01); *G06N 3/098* (2023.01); *H04W 72/04* (2013.01)

(58) Field of Classification Search
CPC ..... H04W 52/04; H04W 16/22; H04W 24/02; H04W 24/10; H04W 4/70;
(Continued)

(56) References Cited

U.S. PATENT DOCUMENTS

| 10,402,469 B2 * | 9/2019 | McMahan ............... G06F 17/17 |
| 2020/0293873 A1 | 9/2020 | Dai et al. |
| 2021/0158099 A1 * | 5/2021 | Tuor ..................... G06N 3/049 |

FOREIGN PATENT DOCUMENTS

| CN | 111176929 A * | 5/2020 | .......... G06F 11/3058 |
| CN | 111784002 A | 10/2020 | |

(Continued)

OTHER PUBLICATIONS

Supplementary European Search Report—EP20965328—Search Authority—The Hague—Jul. 17, 2024.
(Continued)

*Primary Examiner* — Quan M Hua
(74) *Attorney, Agent, or Firm* — Seyfarth Shaw LLP

(57) ABSTRACT

A method performed by a user equipment (UE) generates local gradients for a federated learning task. The method calculates a gradient Sum-Power level based on the local gradients. The method receives a mapping between gradient Sum-Power levels and scaling factors for channel inversion coefficients to process a data block into an unencoded uplink signal. The method also determines a channel inversion coefficient based on a scaling factor obtained from the mapping and the calculated gradient Sum-Power level. The method applies analog modulation and the channel inversion coefficient to the data block to form the unencoded uplink signal. The method further transmits, to a network, the unencoded uplink signal on shared uplink resources for an over-the-air computation of global gradients for the federated learning task.

30 Claims, 10 Drawing Sheets

(51) Int. Cl.
  *H04W 24/02*  (2009.01)
  *H04W 72/04*  (2023.01)
(58) Field of Classification Search
  CPC . H04W 74/0833; H04W 88/02; H04W 88/08;
    H04B 7/0626; H04B 7/0456; H04L
    67/10; H04L 67/025; H04L 41/16; H04L
    67/1097; H04L 67/12; H04L 69/40;
    G06N 3/045; G06N 3/08; G06N 3/084;
    G06N 3/098; G06N 3/063; G06N 3/04;
    G06N 20/00; G06N 20/20; G06N 3/0464;
    G06N 3/044; G06N 3/082; G06N 3/048;
    G06N 3/09; G06N 3/0455; G06N 3/088;
    G06N 3/096; G06N 3/0985; G06N 10/60;
    G06N 10/00; G06N 3/042; G06N 3/047;
    G06N 3/0495; G06N 3/094; G06N 5/01;
    G06N 5/02; G06N 7/01
  See application file for complete search history.

(56) References Cited

FOREIGN PATENT DOCUMENTS

| | | |
|---|---|---|
| CN | 111814985 A | 10/2020 |
| CN | 111866954 A | 10/2020 |
| WO | 2015187071 A1 | 12/2015 |

OTHER PUBLICATIONS

Zhang N., et al., "Gradient Statistics Aware Power Control for Over-The-Air Federated Learning in Fading Channels", Arxiv.Org, Cornell University Library, 201 Olin Library Cornell University Ithaca, NY 14853, arXiv:2003.02089v1 [eess.SP], Mar. 4, 2020, pp. 1-30.

Zhu G., et al., "Broadband Analog Aggregation for Low-Latency Federated Edge Learning", IEEE Transactions on Wireless Communications, Ieee Service Center, Piscataway, NJ, US, vol. 19, No. 1, Oct. 15, 2019, Jan. 2020, pp. 491-506.

Chen M., et al., "Performance Optimization of Federated Learning Over Wireless Networks," IEEE Xplore, 2019 IEEE Global Communications Conference (Globecom), Feb. 27, 2020 (Feb. 27, 2020), sections I-V, 6 pages.

International Search Report and Written Opinion—PCT/CN2020/136041—ISA/EPO—Sep. 15, 2021.

Le T.H.T., et al., "Auction Based Incentive Design for Efficient Federated Learning in Cellular Wireless Networks," IEEE Xplore, 2020 IEEE Wireless Communications and Networking Conference Jun. 19, 2020 (Jun. 19, 2020), sections I-III, 6 pages.

Tran H-V., et al., "Lightwave Power Transfer for Federated Learning-Based Wireless Networks," IEEE Xplore, 2020 EEE Wireless Communications and Networking Conference, Apr. 6, 2020 (Apr. 6, 2020), sections I-V, 5 pages.

* cited by examiner

GRADIENT DATASET AWARE CONFIGURATION FOR OVER-THE-AIR (OTA) MODEL AGGREGATION IN FEDERATED LEARNING

FIELD OF THE DISCLOSURE

Aspects of the present disclosure generally relate to wireless communications, and more particularly to techniques and apparatuses for 5G new radio (NR) gradient dataset aware configuration for over-the-air (OTA) model aggregation in federated learning.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to an aspect of the present disclosure, a method performed by a user equipment (UE) generates local gradients for a federated learning task. The method calculates a gradient Sum-Power level based on the local gradients. The method receives a mapping between gradient Sum-Power levels and scaling factors for channel inversion coefficients to process a data block into an unencoded uplink signal. The method also determines a channel inversion coefficient based on a scaling factor obtained from the mapping and the calculated gradient Sum-Power level. The method also applies analog modulation and the channel inversion coefficient to the data block to form the unencoded uplink signal. The method further transmits, to a network, the unencoded uplink signal on shared uplink resources for an over-the-air computation of global gradients for the federated learning task.

In another aspect of the present disclosure, an apparatus for wireless communications performed by a user equipment (UE), includes a processor and memory coupled with the processor. Instructions stored in the memory are operable, when executed by the processor, to cause the apparatus to generate local gradients for a federated learning task. The apparatus can also calculate a gradient Sum-Power level based on the local gradients. The apparatus can receive a mapping between gradient Sum-Power levels and scaling factors for channel inversion coefficients to process a data block into an unencoded uplink signal. The apparatus can determine a channel inversion coefficient based on a scaling factor obtained from the mapping and the calculated gradient Sum-Power level. The apparatus can also apply analog modulation and the channel inversion coefficient to the data block to form the unencoded uplink signal. The apparatus can further transmit, to a network, the unencoded uplink signal on shared uplink resources for an over-the-air computation of global gradients for the federated learning task.

In another aspect of the present disclosure, a user equipment (UE) includes means for generating local gradients for a federated learning task. The UE includes means for calculating a gradient Sum-Power level based on the local gradients. The UE includes means for receiving a mapping between gradient Sum-Power levels and scaling factors for channel inversion coefficients to process a data block into an unencoded uplink signal. The UE also includes means for determining a channel inversion coefficient based on a scaling factor obtained from the mapping and the calculated gradient Sum-Power level. The UE also includes means for applying analog modulation and the channel inversion coefficient to the data block to form the unencoded uplink signal. The UE further includes means for transmitting, to a network, the unencoded uplink signal on shared uplink resources for an over-the-air computation of global gradients for the federated learning task.

In another aspect of the present disclosure, a non-transitory computer-readable medium with program code recorded thereon is disclosed. The program code is executed by a user equipment (UE) and includes program code to generate local gradients for a federated learning task. The UE includes program code to calculate a gradient Sum-Power level based on the local gradients. The UE includes program code to receive a mapping between gradient Sum-Power levels and scaling factors for channel inversion coefficients to process a data block into an unencoded uplink signal. The UE includes program code to determine a channel inversion coefficient based on a scaling factor obtained from the mapping and the calculated gradient Sum-Power level. The UE also includes program code to apply analog modulation and the channel inversion coefficient to the data block to form the unencoded uplink signal. The UE further includes program code to transmit, to a network, the unencoded uplink signal on shared uplink resources for an over-the-air computation of global gradients for the federated learning task.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
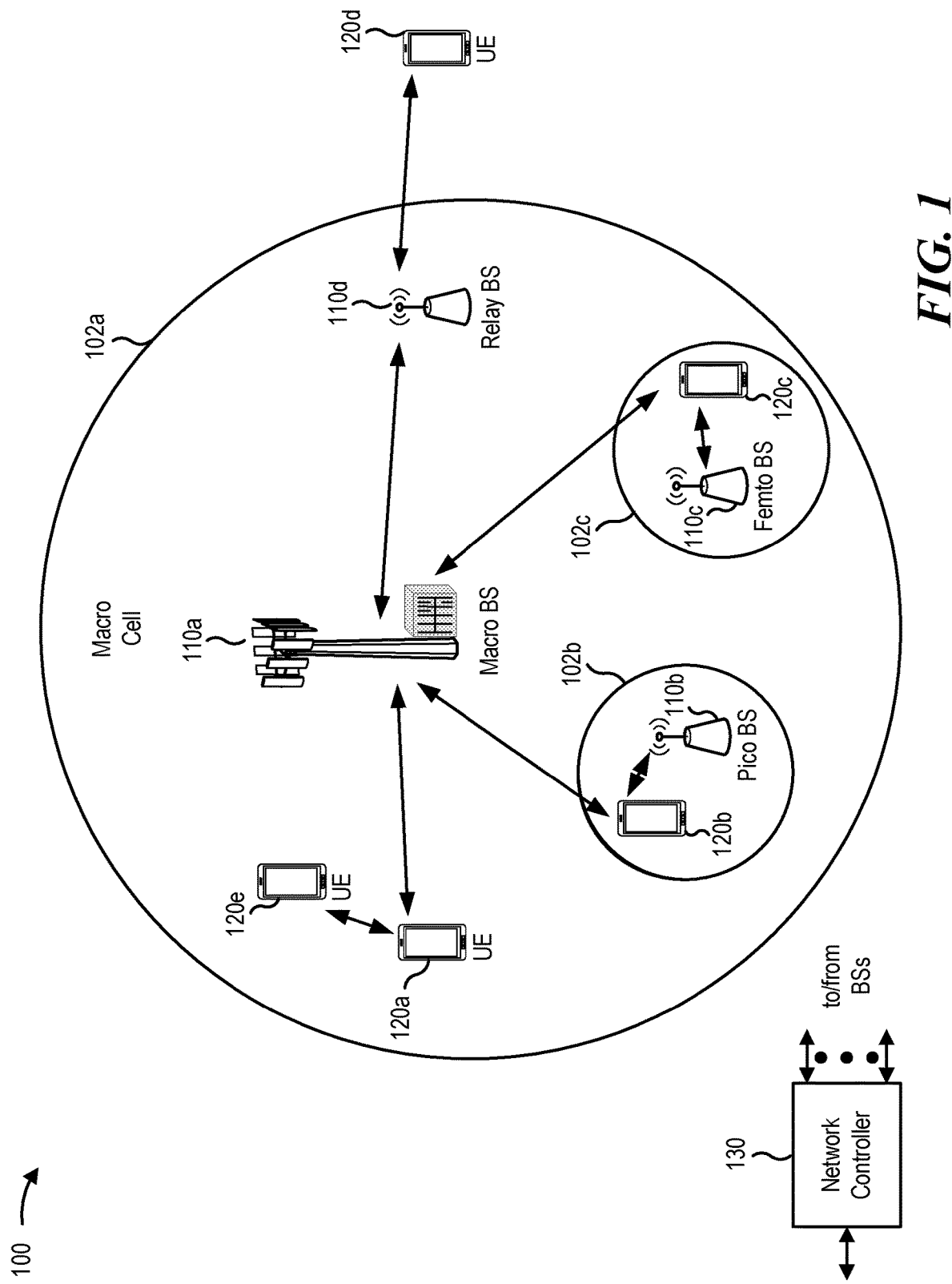
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In some wireless communications systems, a user equipment (UE) may transmit data to a network device (e.g., an edge server, a remote parameter server, a base station, etc.). In such systems, the data may include gradients or parameters generated locally by the UE with a local data model (e.g., an artificial intelligence or machine learning model).

The network device may aggregate data from multiple UEs to generate a global or general data model. Such a technique is referred to as federated learning.

In some cases, multiple UEs may transmit data to the network device across a shared channel (e.g., a multiple access channel (MAC)) as part of an over-the-air (OTA) computation procedure supporting data aggregation. The UEs may determine pre-equalization parameters (e.g., channel inversion coefficients, pre-equalization coefficients, transmit power, etc.) as part of the air computation procedure. However, the UEs may lack the coordination or configuration capabilities to accurately or efficiently determine the pre-equalization parameters. For example, conventional over-the-air aggregation only considers channel inversion at the UE side based on channel state information (CSI). The CSI inversion may be sufficient for the case where different UEs upload parameters with similar ranges (e.g., the UEs are stationary). When the OTA aggregation is applied to gradients for federated learning, the gradients transmitted by different UEs are non-stationary.

UEs having greater gradient absolute values may observe training-data favoring faster model convergence. The absolute values of gradients are generally decreasing as training converges, but different UEs may experience a different decreasing rate. A channel state information (CSI) only inversion may average out contributions from UEs, with gradients having greater absolute values, from the final gradient averaging. This may prevent the network device from efficiently aggregating the gradients from the UEs, which may degrade system performance.

According to aspects of the present disclosure, a network device may configure a UE to identify or determine one or more parameters related to the transmission of gradients to the network as part of a federated learning task. The parameters may relate to channel inversion coefficients. For example, the network device may transmit a control message (e.g., a radio resource control (RRC) message, a media access control-control element (MAC-CE), a downlink control information (DCI) message, etc.) to the UE, and the control message may configure the UE to determine the channel inversion coefficients for transmission of the gradients. In some aspects, the control message may include a mapping between gradient Sum-Power levels and an associated scaling factor for determining the channel inversion coefficients. In some cases, the mapping is predetermined in a telecommunications standard, rather than signaled to the UE.

According to further aspects of the present disclosure, a UE reports its gradient Sum-Power for each round or group of rounds of a federated learning task. Before a certain round of gradient OTA aggregation, a UE may receive a configuration from the network (e.g., base station) for reporting a gradient Sum-Power identified in this round. The configuration may be monitored for each round of OTA aggregation, or a group of OTA aggregation rounds, or once for the entire training task. The reporting configuration may alternatively be defined in a telecommunications standard. The configuration may include information such as quantization levels for the reported gradient Sum-Power and/or information for scheduling uplink resources to be used for such reporting.

According to still further aspects of the present disclosure, a UE may receive from the network an indication of a scaling factor for determining the channel inversion coefficients. The indication may be received before a certain round of gradient OTA aggregation. The indication of the scaling factor may be associated with a reported gradient Sum-Power. UE-group-specific scaling factors associated with the gradient Sum-Power may be configured to a group of UEs via a group-common DCI, MAC-CE or RRC signaling. Multiple scaling factors may be configured for the group, such as with the mapping previously described. The scaling factor may be a power measurement, such as a dB value, for a certain group of UEs based on a reference signal received power (RSRP) calculated from reference signals when determining the channel inversion coefficients.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
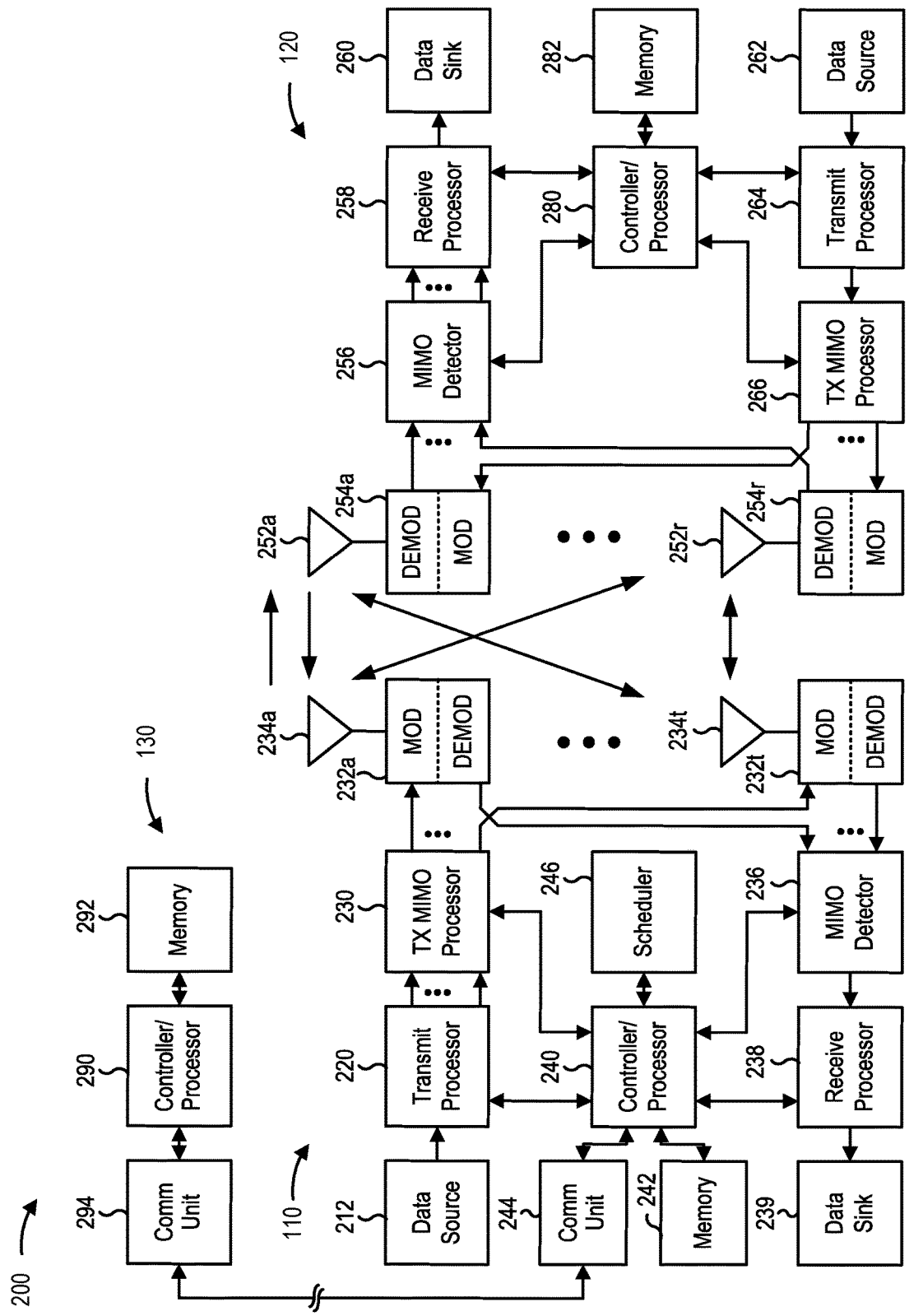
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with gradient aware configuration, as described in more detail elsewhere. For example, the controller/processor 240 of the base station 110, the controller/processor 280 of the UE 120, and/or any other component(s) of FIG. 2 may perform or direct operations of, for example, the processes of FIGS. 8 and 9 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for generating, means for calculating, means for determining, means for applying, means for transmitting, means for mapping, and/or means for reporting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
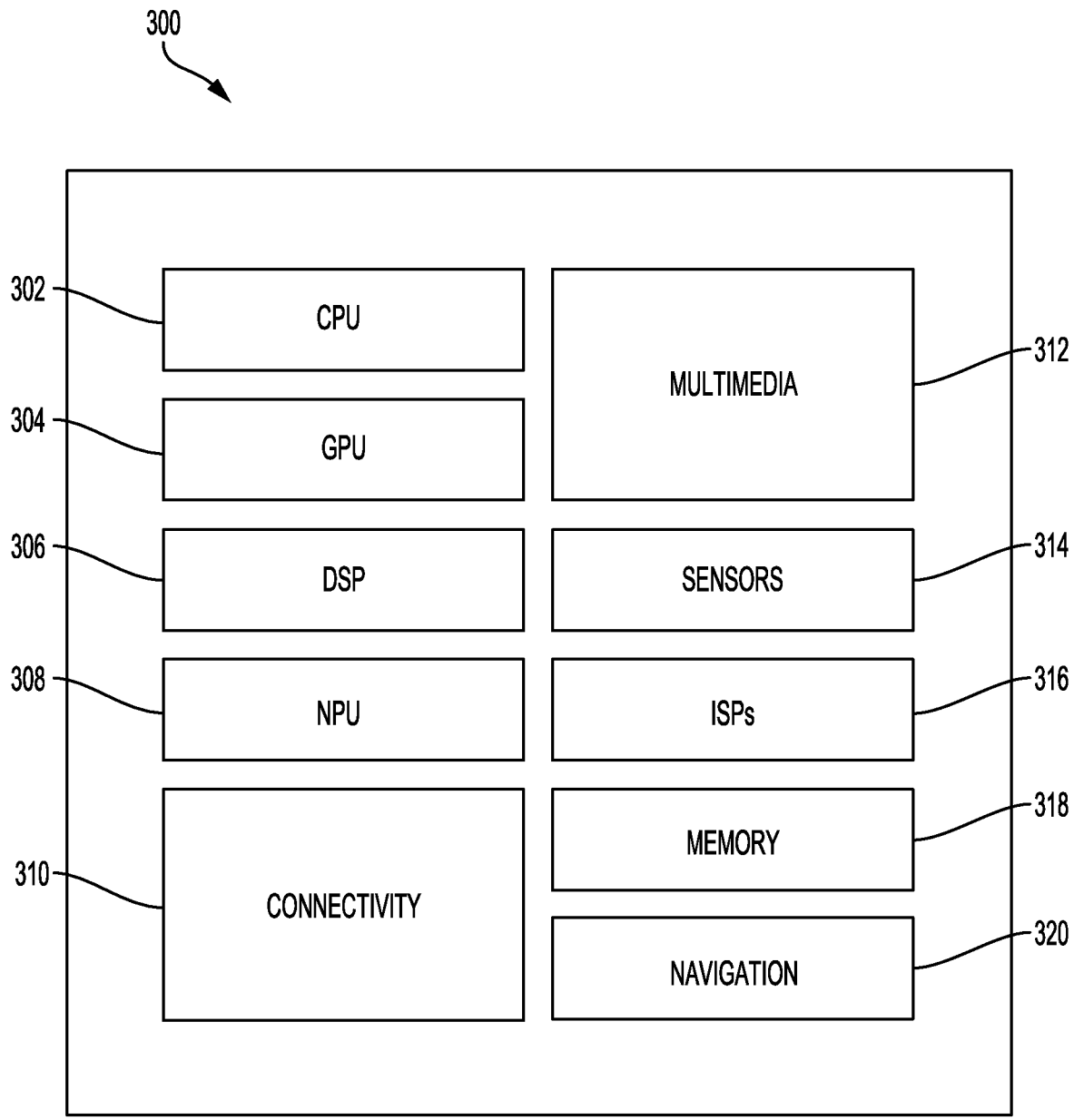
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for gradient aware configuration for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to generate local gradients for a federated learning task. The general-purpose processor 302 may comprise code to calculate a gradient Sum-Power level based on the local gradients. The general-purpose processor 302 may comprise code to receive a mapping between gradient Sum-Power levels and scaling factors for channel inversion coefficients to process a data block into an unencoded uplink signal. The general-purpose processor 302 may also comprise code to determine a channel inversion coefficient based on a scaling factor obtained from the mapping and the calculated gradient Sum-Power level. The general-purpose processor 302 may also comprise code to apply analog modulation and the channel inversion coefficient to the data block to form the unencoded uplink signal. The general-purpose processor 302 may further comprise code to transmit, to a network, the unencoded uplink signal on shared uplink resources for an over-the-air computation of global gradients for the federated learning task.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
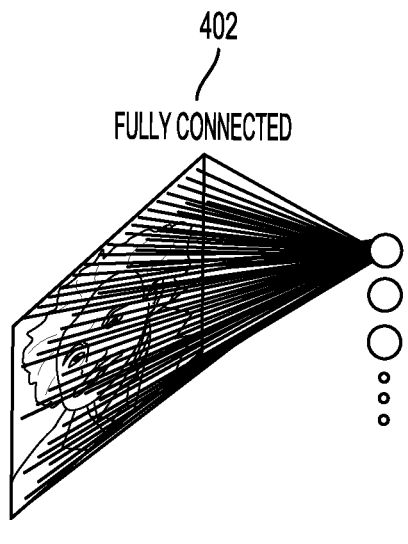
FIGS. 4A, 4B, and 4C are diagrams illustrating a neural network, in accordance with aspects of the present disclosure.
Figure 4B:
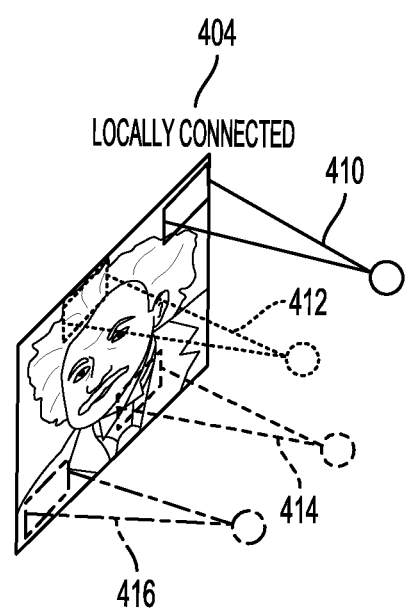

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
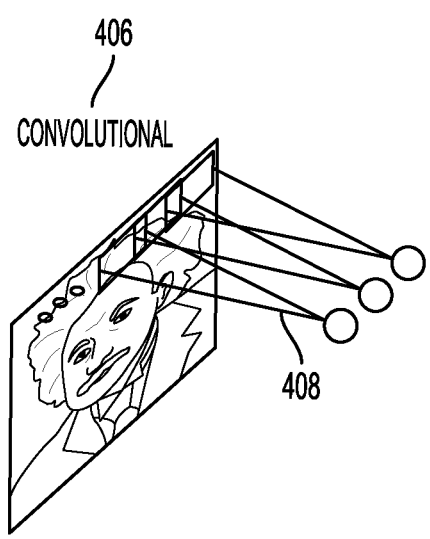

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
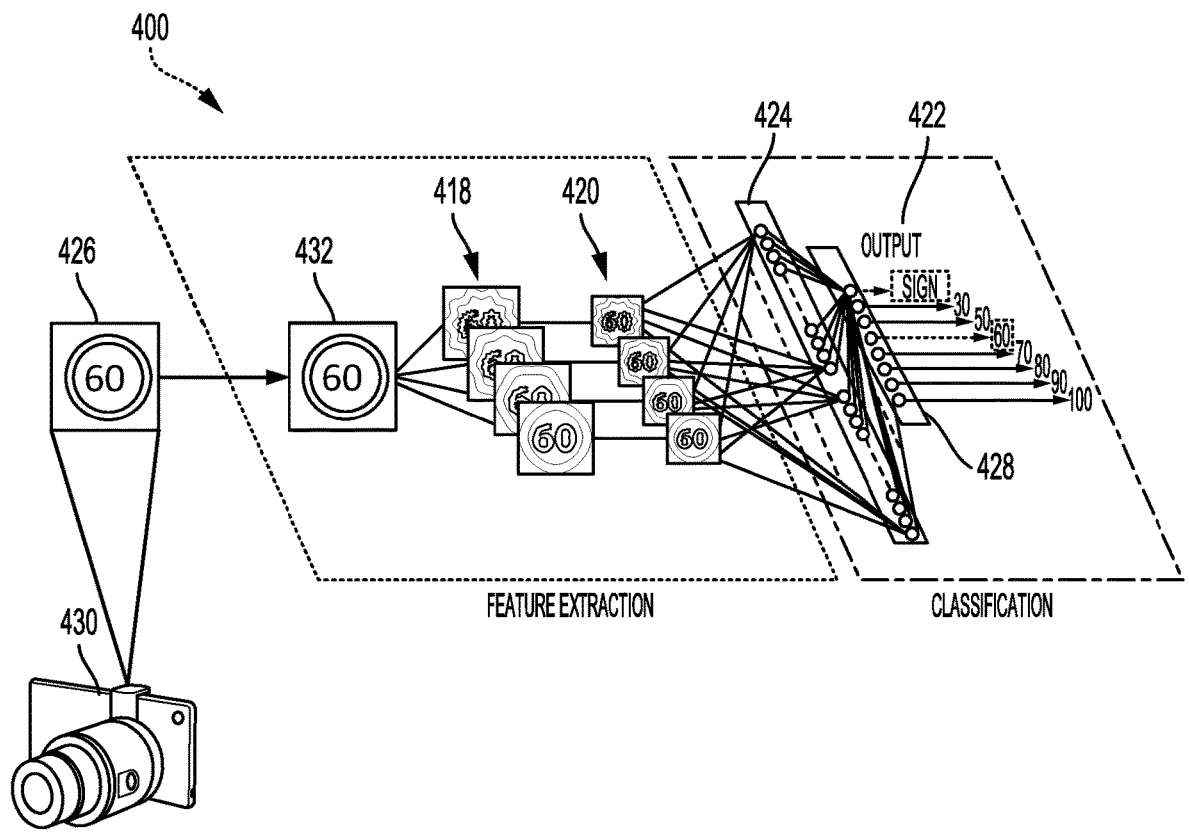
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
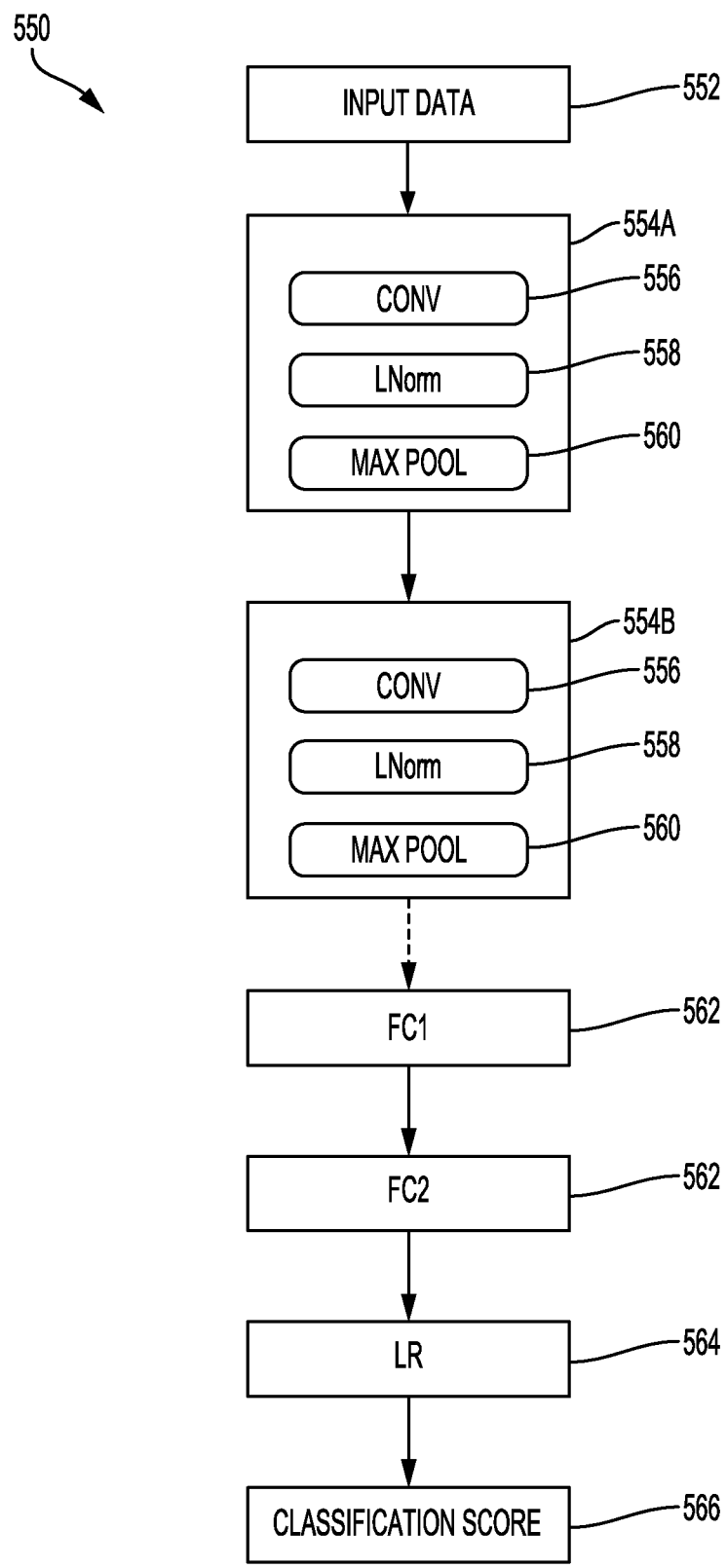
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

As described above, in some wireless communications systems, a user equipment (UE) may transmit data to a network device (e.g., an edge server, a remote parameter server, a base station, etc.). In such systems, the data may include gradients or parameters generated locally by the UE with a local data model (e.g., an artificial intelligence or machine learning model). The network device may aggregate data from multiple UEs to generate a global or general data model. Such a technique is referred to as federated learning.

In some cases, multiple UEs may transmit data to the network device across a shared channel (e.g., a multiple access channel (MAC)) as part of an over-the-air (OTA) computation procedure supporting data aggregation. The UEs may determine pre-equalization parameters (e.g., channel inversion coefficients, pre-equalization coefficients, transmit power, etc.) as part of the air computation procedure. However, the UEs may lack the coordination or configuration capabilities to accurately or efficiently determine the pre-equalization parameters. For example, conventional over-the-air aggregation only considers channel inversion at the UE side based on channel state information (CSI). The CSI inversion may be sufficient for the case where different UEs upload parameters with similar ranges (e.g., the UEs are stationary). When the OTA aggregation is applied to gradients for federated learning, the gradients transmitted by different UEs are non-stationary.

UEs having greater gradient absolute values may observe training-data favoring faster model convergence. The absolute values of gradients generally decrease as training converges, but different UEs may experience a different decreasing rate. A channel state information (CSI) only inversion may average out contributions from UEs, with gradients having greater absolute values, from the final gradient averaging. This may prevent the network device from efficiently aggregating the gradients from the UEs, which may degrade system performance.

The training of artificial intelligence (AI) models via computation at edge devices/servers occurs when local training is triggered by an edge server. Local models are then distributed, trained, and uploaded to the edge server. The uploaded parameters can be either parameters in a machine learning model, such as a recurrent neural network (RNN), or gradients to derive the machine learning model. The edge server aggregates information from the local models to update a global model at the edge server. The aggregation can be a simple parameter/gradient averaging. The edge server then broadcasts the updated global model to each of the edge devices.

An advantage of federated learning is fast access to real-time data generated at edge devices for fast training of AI-models. Also, there is no need to consume large radio resources/delay for a raw data transfer and there is better privacy because raw data is not necessarily needed. For example, gradients may be transmitted from the edge devices, instead of the raw data.

Figure 6:
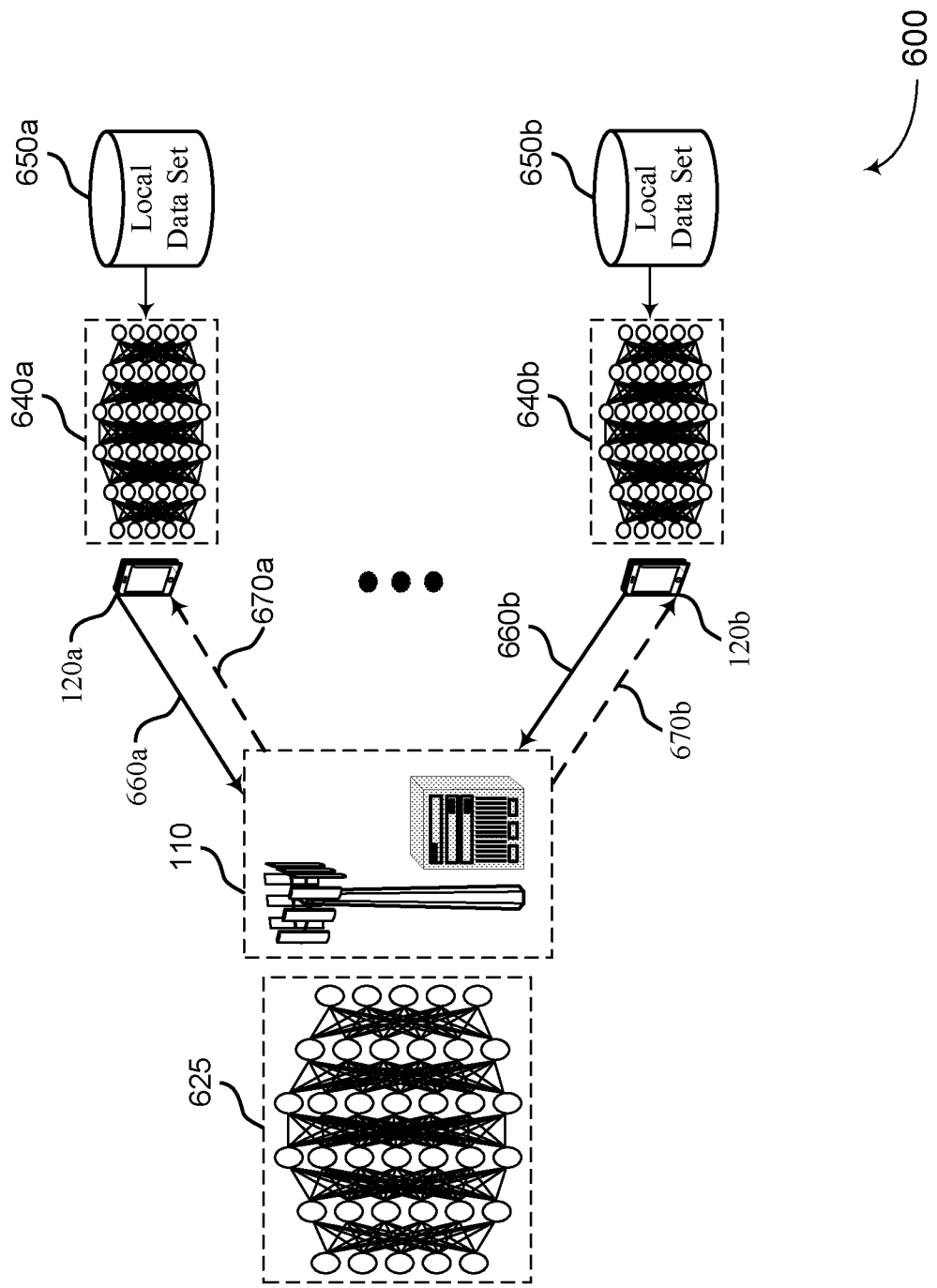
FIG. 6 is a block diagram illustrating a federated learning technique that supports gradient dataset aware configuration for over-the-air model aggregation, in accordance with aspects of the present disclosure.

FIG. 6 illustrates an example of a federated learning system 600 that supports gradient dataset aware configuration for over-the-air model aggregation in accordance with aspects of the present disclosure. In some examples, the federated learning system 600 may implement aspects of the wireless communication system 100 described with reference to FIG. 1. The federated learning system 600 may include UEs 120a and 120b, and a base station 110, which may be examples of the UEs 120 and base station 110 described with reference to FIG. 1.

The federated learning system 600 may update a global data model 625 based on local data models 640. In some cases, a data model may correspond to a neural network, and a global data model may correspond to a general data model.

The UE 120a may generate a local data model 640a based on a local data set 650a and transmit a set of parameters or gradients corresponding to the local data model 640a across a multiple access channel 660a to the base station 110. The UE 120b may generate local data model 640b based on a local data set 650b and transmit a set of parameters or gradients corresponding to the local data model 640b across the multiple access channel 660b to the base station 110. The UEs 120a and 120b may modulate the sets of parameters or gradients into a sequence of symbols, divide the sequence of symbols into data blocks, and transmit each data block across the multiple access channel 660 in an orthogonal frequency division multiplexed (OFDM) symbol, where one parameter or gradient is transmitted across a subchannel of the multiple access channel 660 during the OFDM symbol. The transmit power for a subchannel may be selected to mitigate channel fade.

The base station 110 may receive a set of aggregate parameters or aggregate gradients corresponding to the parameters or gradients of the local models 640. The base station 110 may aggregate the received gradients or parameters by, for example, calculating a set of average parameters or average gradients, and update a global model 625 with the set of aggregated parameters or gradients. The base station 110 may broadcast the updated parameters or gradients of the global model 625 to the UEs 120 via a broadcast channel 670a and 670b. In some cases, the UEs 120 may further train the local models 640 and determine another round of local parameters or gradients based on receiving a training indication from the base station 110.

This process of training neural networks at UEs 120, transmitting parameters or gradients of the neural networks to the base station 110, and receiving an indication of an updated global model from the base station 110 may be considered a communication round. Communication rounds may continue until the base station 110 determines that the global model converges (e.g., the loss of the global model approaches a minima with a decreasing trend), and the base station 110 may refrain from broadcasting an indication of the updated model to the UEs 120 based on determining that the global model has converged. Performing a distributed learning process may improve data security and privacy, as UEs 120 may transmit neural network parameters or gradients to a base station 110 instead of raw data. Additionally, an over-the-air computation procedure for concurrent analog transmissions may harness the signal-superposition property of a shared channel, thereby improving system efficiency.

Over-the-air (OTA) computation (also referred to as "Air-Comp") for federated learning uses a wireless multiple access channel (MAC) for AI-model aggregation. Uncoded analog modulation with pre-equalization is used for each OFDM tone. The pre-equalization may include channel inversion (e.g., truncated channel inversions) or power modulation based on the channel. For OTA computation, all UEs may transmit parameters using fully overlapping radio resources. That is, all UEs share the same time and frequency resources. The parameters received at the network device (e.g., base station) from different UEs may have the same amplitude, and are therefore easier to average. OTA computation may be applied to both neural network weights and gradients.

Figure 7:
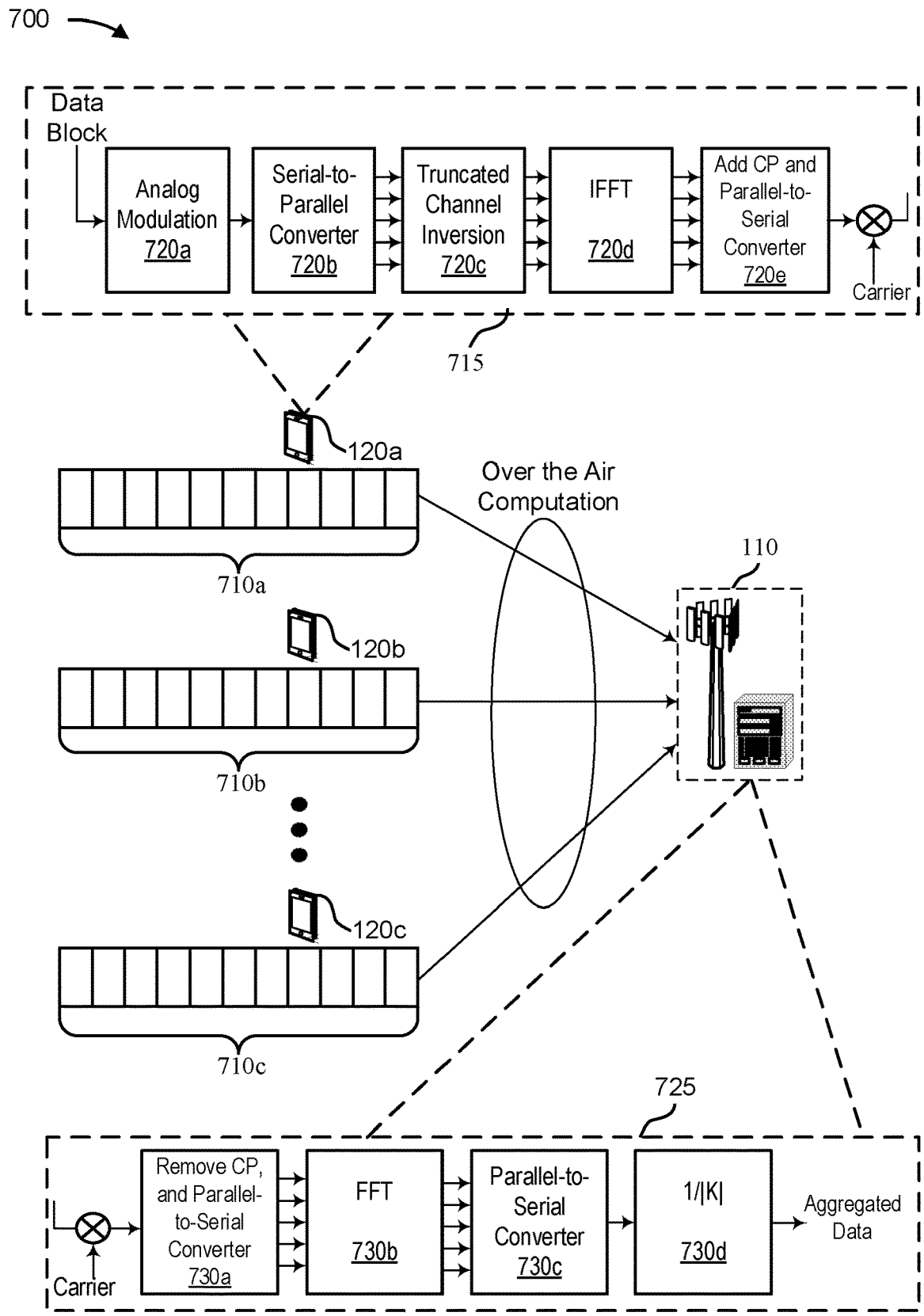
FIG. 7 illustrates an example of an over-the-air computation technique that supports gradient dataset aware configuration for over-the-air model aggregation in federated learning, in accordance with aspects of the present disclosure.

FIG. 7 illustrates an example of an over-the-air computation technique 700 that supports gradient dataset aware configuration for over-the-air model aggregation in federated learning, in accordance with aspects of the present disclosure. In some examples, the over-the-air computation technique 700 may implement aspects of the wireless communication system 100 described with respect to FIG. 1. The over-the-air computation technique 700 may include a network device 110 (e.g., a base station, an edge server, a remote parameter server, etc.), which may be an example of the base station 110 described with reference to FIG. 1, as well as UE 120a, UE 120b, and UE 120c, which may be examples of UEs 120 described with reference to FIG. 1.

Multiple UEs 120 (e.g., UE 120a, UE 120b, and UE 120c) may transmit data to the network device 110 based on a transmitter design 715. The transmitter design 715 may apply analog modulation (e.g., analog amplitude modulation) and pre-equalization to a data block to form an unencoded uplink signal, and the unencoded uplink signal may be transmitted to the network device 110 across a shared channel (e.g., a multiple access channel). Transmitting unencoded uplink signals across a shared channel may support over-the-air computation, which may reduce data transmission latency and decrease the amount of radio resources consumed.

The UE 120a may be associated with radio resources 710a, the UE 120b may be associated with radio resources 710b, and the UE 120c may be associated with radio resources 710c. The radio resources 710a, 710b, and 710c may partially or fully overlap (e.g., may correspond to the same time and frequency resources) and correspond to a multiple access channel. The UEs 120 may apply pre-equalization parameters (e.g., channel inversion coefficients, transmission power scaling) to the unencoded uplink signal to improve signal characteristics (e.g., the received signal power at the network device 110, the signal-to-noise ratio, etc.), which may improve the efficiency of aggregating the data received at the network device 110.

The UE 120a may process a data block according to the transmitter design 715. The transmitter design 715 may apply analog modulation (e.g., analog amplitude modulation) to a data block at block 720a, perform serial-to-parallel conversion at block 720b, perform truncated channel inversion at block 720c, perform inversion Fast Fourier Transformation (IFFT) at block 720d, and add a cyclic prefix (CP) and perform parallel-to-serial conversion at block 720e. The resulting data may be transmitted to the network device 110 via a carrier (e.g., a multiple access channel). In some cases, the UEs 120 may transmit parameters or gradients of a data model (e.g., a neural network) to the network device 110, however, such techniques may also be applicable to other scenarios such as distributed sensor measurements, among others.

The network device 110 may process a superimposed waveform received from multiple devices via the carrier, according to a receiver design 725. The network device 110 may remove the CP and perform parallel-to-serial conversion at block 730a, perform Fast Fourier Transformation (FFT) at block 730b, perform parallel-to-serial conversion at block 730c, and average the aggregate parameters or gradients (e.g., divide the aggregate parameters and/or gradients by the number of UEs 120 (e.g., K)) at block 730d. As such, the network device 110 may receive one or more aggregate values (e.g., aggregate parameters, aggregate edge weights, aggregate gradients, etc.) corresponding to the aggregation of values from the UEs 120 and average the aggregate values by dividing the aggregate values by the number of UEs 120 transmitting data (e.g., parameters and/or gradients) on the shared channel. The network device 110 may update parameters or gradients of a global data model based on the aggregate or average values and transmit (e.g., broadcast) the updated parameters and/or gradients to the UEs 120.

The network device 110 may configure the UE 120 to identify or determine one or more parameters related to the processing or transmission of gradients carried by the unencoded uplink signal. The parameters may relate to channel inversion coefficients. For example, the network device 110 may transmit a control message (e.g., an RRC message, a MAC-CE, a DCI, etc.) to the UE 120, and the control message may configure the UE 120 to determine the channel inversion coefficients. The control message may include a mapping between gradient Sum-Power levels and an associated scaling factor for determining the channel inversion coefficients. In some cases, the mapping is predetermined in a telecommunications standard, rather than signaled to the UE.

It has been proposed to consider, apart from the original channel gain, a virtual channel gain when calculating the channel inversion coefficients. The virtual channel gain is proportional to the inverse of a Sum-Power value of the gradients. Sum-Power is the mathematical operation where a sum of the absolute value of each local gradient squared is calculated for each UE, as seen in equation (1)

$$\Sigma_1^k |b_{k,n}|^2, \tag{1}$$

where b represents the kth gradient coefficient and n is the UE index. Thus, for each $UE_n$, a transmission weight is determined based on the Sum-Power. This proposal can accelerate training convergence in the case of CSI and data aware OTA aggregation. For example, for UEs with similar channel gains, the UE with the greater gradient absolute values would have a lower virtual channel gain, and would receive greater channel inversion coefficients (e.g., higher transmission power) than the other UEs.

Aspects of the present disclosure introduce signaling enhancements to support the above proposal. According to aspects of the present disclosure, a UE is configured via radio resource control (RRC) signaling, a MAC-control element (MAC-CE), or downlink control information (DCI) with mappings between gradient Sum-Power levels, and an associated scaling factor for determining the channel inversion coefficients. That is, scaling factors for transmitting the gradients are based on gradient Sum-Power levels. When the Sum-Power of the gradients is smaller, the transmission power is lower. The mapping may alternatively be defined in a telecommunications standard, instead of signaled by the network.

In one example, when the gradient Sum-Power is greater than five but lower than ten, the channel inversion coefficient is scaled by a factor of one. When the gradient Sum-Power is greater than one but lower than five, the channel inversion coefficient is scaled by a factor of 0.2. In this example, when the gradient Sum-Power is lower than one, the channel inversion coefficient is scaled by a factor of 0.05.

According to other aspects of the present disclosure, such mappings may be specifically configured or indicated for different training tasks. For example, a federated learning training task with more gradients (or a more complex NN) may have greater Sum-Power ranges. In the example above, the first range was from five to ten. With a larger number of gradients, the first range of Sum-Power values may be from twenty to thirty.

As described above, multiple rounds of aggregation occur during a federated learning task. According to aspects of the present disclosure, a UE reports its gradient Sum-Power level for each round or group of rounds. Before a certain round of gradient OTA aggregation, a UE may receive a configuration from the network (e.g., base station) for reporting a gradient Sum-Power identified in this round. The reporting configuration may be monitored for each round of OTA aggregation, or a group of OTA aggregation rounds, or once for an overall training task. The reporting configuration may alternatively be defined in a telecommunications standard.

In some aspects, the reporting configuration is received via a conventional UE-specific downlink channel. For example, the configuration may be received via a unicast physical downlink shared channel (PDSCH) or physical downlink control channel (PDCCH), a MAC-CE, or RRC signaling. In other aspects, the configuration is received via a group-common downlink channel (e.g., broadcast PDSCH or PDCCH).

The reporting configuration may comprise information such as quantization levels for the reported gradient Sum-Power. For example, the configuration may indicate certain levels of quantization with a limited number of bits. The configuration may include information for scheduling uplink resources that can be used for such reporting. The uplink channel may be a conventional UE-specific uplink channel, such as the physical uplink shared channel (PUSCH), physical uplink control channel (PUCCH), a MAC-CE, or RRC signaling.

According to further aspects of the present disclosure, a UE may receive from the network an indication of a scaling factor for determining the channel inversion coefficients. The indication may be received before a certain round of gradient OTA aggregation. The indication of the scaling factor may be associated with the reported gradient Sum-Power. The indication may be received via a conventional UE-specific downlink channel (e.g., unicast PDSCH or PDCCH, MAC-CE, or RRC signaling). The indication may alternatively be received via a group-common downlink channel (e.g., broadcast PDSCH/PDCCH).

A UE-group-specific scaling factor associated with a gradient Sum-Power level may be configured to a group of UEs via a group-common DCI, MAC-CE, or RRC signaling. Multiple scaling factors may be configured for the group, such as with the mapping previously described. The scaling factor may be a power measurement, such as a dB value, for a certain UE based on a reference signal received power (RSRP) calculated from reference signals (e.g., the CSI-RS and/or synchronization signal block (SSB)) when determining the channel inversion coefficients. In this case, the scaling factor may be signaled to the UE together with signaling triggering the reference signal. For example, a single CSI-RS may be used for a group of UEs with similar RSRP levels. The scaling factors for the UEs may be included in RRC signaling, a MAC-CE, or DCI message triggering the CSI-RS.

Figure 8:
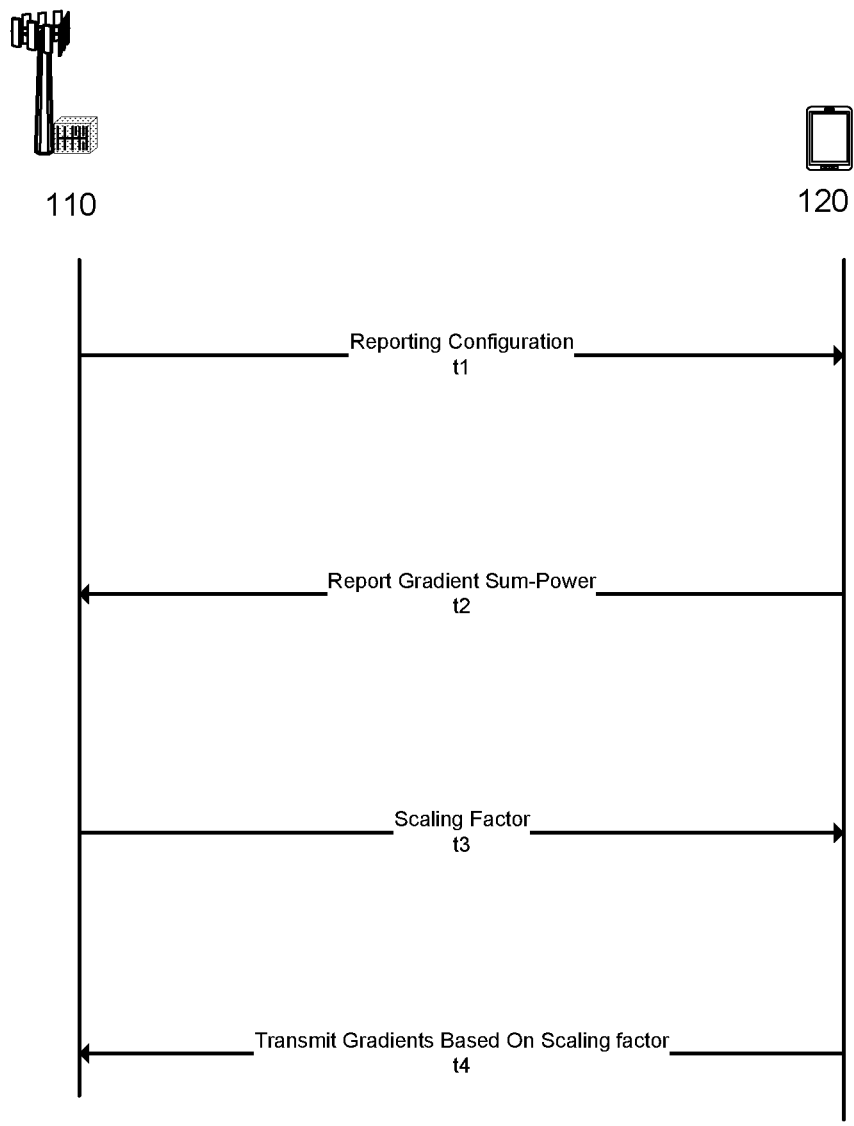
FIG. 8 is a timing diagram illustrating an example federated learning process with gradient dataset aware configuration, in accordance with various aspects of the present disclosure.

FIG. 8 is a timing diagram illustrating an example federated learning process with gradient dataset aware configuration, in accordance with various aspects of the present disclosure. In federated learning, multiple UEs communicate with a base station (as shown in FIG. 6). For ease of explanation, in FIG. 8, only a single UE 120 is shown communicating with a base station 110.

At time t1, the base station 110 transmits a reporting configuration to the UE 120. The reporting configuration enables the UE 120 to report a gradient Sum-Power level to the base station 110. The reporting configuration may be received via a unicast physical downlink shared channel (PDSCH) or physical downlink control channel (PDCCH), a MAC-CE, or RRC signaling. The reporting configuration may comprise information such as quantization levels for the reported gradient Sum-Power and information for scheduling uplink resources that can be used for such reporting.

At time t2, the UE 120 reports its gradient Sum-Power. The reporting may be via a conventional UE-specific uplink channel such as the physical uplink shared channel (PUSCH), physical uplink control channel (PUCCH), a MAC-CE, or RRC signaling. In response to receiving the gradient Sum-Power from the UE 120 and gradient Sum-Power values from other UEs participating in the federated learning task, the base station 110 determines an appropriate scaling factor for each UE. At time t3, the base station 110 transmits, to the UE 120, the scaling factor determined for the UE 120. In some aspects, the base station 110 transmits a mapping of scaling factors to gradient Sum-Power values. In some aspects, the base station 110 transmits scaling factors to a group of UEs with similar RSRP levels.

The UE 120 determines a channel inversion coefficient based on the scaling factor. The UE 120 then applies analog modulation and the determined channel inversion coefficient to locally calculated gradients to form an unencoded uplink signal. At time t4, the UE 120 transmits the unencoded uplink signal on shared uplink resources for an over-the-air computation of global gradients for the federated learning task. The uplink resources are shared with the other UEs participating in the federated learning task.

Figure 9:
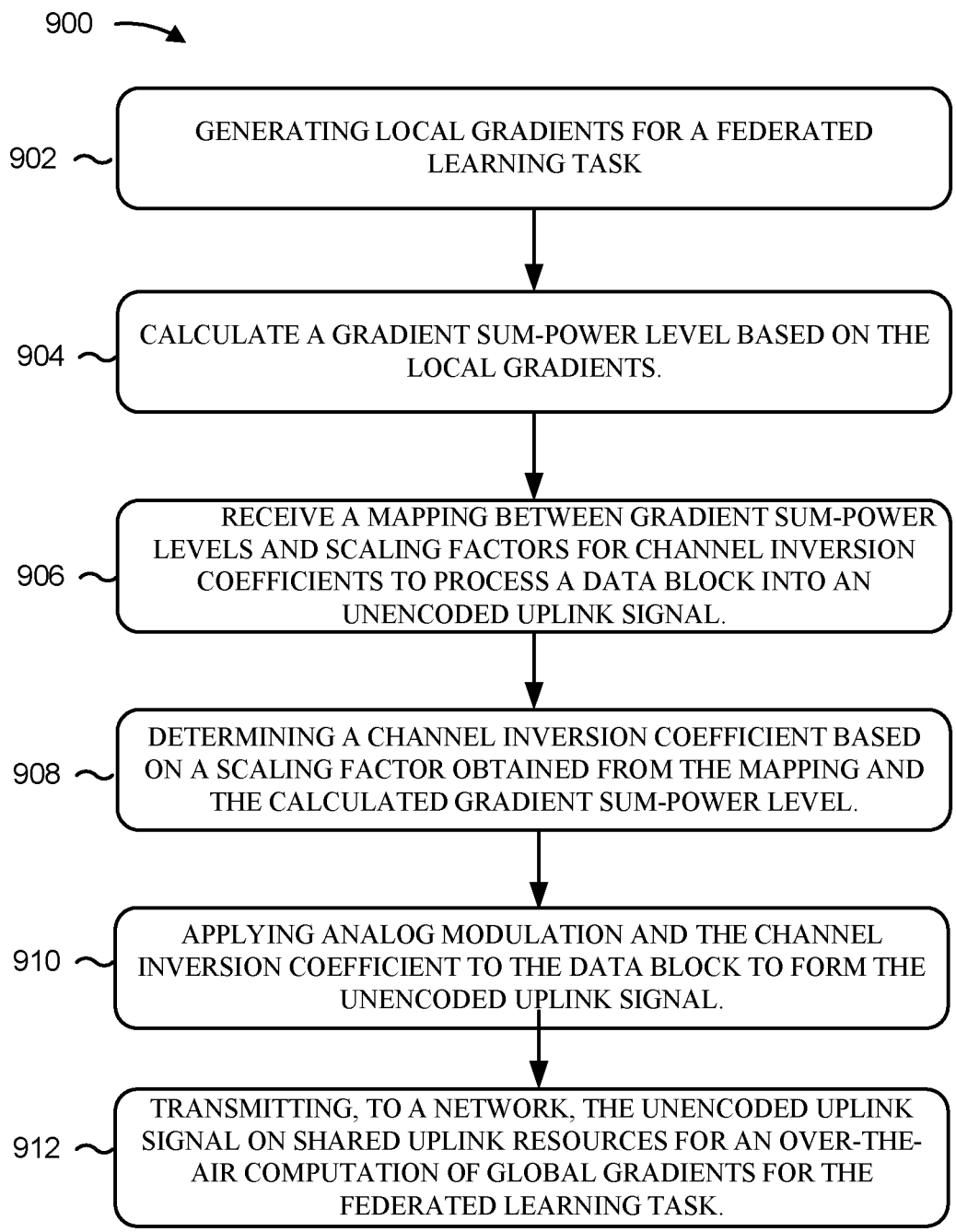
FIG. 9 is a diagram illustrating an example federated learning process with gradient dataset aware configuration performed, for example, by a user equipment (UE), in accordance with various aspects of the present disclosure.

FIG. 9 is a diagram illustrating an example federated learning process with gradient dataset aware configuration performed, for example, by a user equipment (UE), in accordance with various aspects of the present disclosure.

As shown in FIG. 9, in some aspects, the process 900 may include generating local gradients for a federated learning task (block 902). For example, the user equipment (UE) (e.g., using the controller/processor 280, and/or memory 282) can generate local gradients. The process 900 may also include calculating a gradient Sum-Power level based on the local gradients (block 904). For example, the UE (e.g., using the controller/processor 280, and/or memory 282) can calculate a gradient Sum-Power level. The process 900 may also include receiving a mapping between gradient Sum-Power levels and scaling factors for channel inversion coefficients to process a data block into an unencoded uplink signal (block 906). For example, the UE (e.g., using the antenna 252, DEMOD/MOD 254, MIMO detector 256, receive processor 258, controller/processor 280, and/or memory 282) can receive a mapping. The process 900 may also include determining a channel inversion coefficient based on a scaling factor obtained from the mapping and the calculated gradient Sum-Power level (block 908). For example, the UE (e.g., using the controller/processor 280, and/or memory 282) can determine a channel inversion coefficient.

In some aspects, the process 900 may include applying analog modulation and the channel inversion coefficient to the data block to form the unencoded uplink signal (block 910). For example, the UE (e.g., using the controller/processor 280, and/or memory 282) can apply analog modulation and the channel inversion coefficient to the data block. The process 900 may include transmitting, to a network, the unencoded uplink signal on shared uplink resources for an over-the-air computation of global gradients for the federated learning task (block 912). For example, the UE (e.g., using the antenna 252, DEMOD/MOD 254, TX MIMO processor 266, transmit processor 264, controller/processor 280, and/or memory 282) can transmit, to a network.

Implementation examples are described in the following numbered clauses.

1. A method of wireless communication performed by a user equipment (UE), comprising:
   generating local gradients for a federated learning task;

calculating a gradient Sum-Power level based on the local gradients;
receiving a mapping between gradient Sum-Power levels and scaling factors for channel inversion coefficients to process a data block into an unencoded uplink signal;
determining a channel inversion coefficient based on a scaling factor obtained from the mapping and the calculated gradient Sum-Power level;
applying analog modulation and the channel inversion coefficient to the data block to form the unencoded uplink signal; and
transmitting, to a network, the unencoded uplink signal on shared uplink resources for an over-the-air computation of global gradients for the federated learning task.

2. The method of clause 1, in which the mapping is associated with the federated learning task.

3. The method of clause 2, in which the mapping comprises a range of Sum-Power levels assigned to each of the scaling factors.

4. The method of clause 3, in which the federated learning task comprises a training task with a number of gradients, the number of gradients exceeding a threshold causing an increase of the range of Sum-Power levels assigned to each of the scaling factors.

5. The method of any of the preceding clauses, in which the mapping is defined in a telecommunications standard.

6. The method of any of the preceding clauses, further comprising:
receiving a configuration for reporting the calculated gradient Sum-Power associated with a round of gradient over-the-air aggregation; and
reporting the calculated gradient Sum-Power based on the configuration.

7. The method of clause 6, in which receiving the configuration occurs via a UE-specific downlink channel.

8. The method of clauses 6 or 7, in which receiving the configuration occurs via a group-common downlink channel.

9. The method of clauses 6-8, in which the configuration indicates a quantization level for reporting the calculated gradient Sum-Power.

10. The method of clauses 6-9, in which the configuration comprises an allocation of uplink resources for the reporting.

11. The method of clauses 6-10, in which the configuration corresponds to a plurality of rounds of the gradient over-the-air aggregation.

12. The method of clause 11, in which the plurality of rounds comprise the overall federated learning task.

13. The method of clauses 6-12, in which the reporting occurs via a UE-specific uplink channel.

14. The method of any of the preceding clauses, in which receiving the mapping occurs via a group-common downlink channel associated with a selected gradient Sum-Power.

15. The method of clause 14, in which the scaling factor corresponds to a reference signal received power (RSRP) value associated with the channel inversion coefficient.

16. The method of clause 15, further comprising receiving the scaling factor along with a message triggering a reference signal associated with the RSRP value.

17. An apparatus for wireless communications performed by a user equipment (UE), comprising:
a processor,
memory coupled with the processor; and
instructions stored in the memory and operable, when executed by the processor, to cause the apparatus:
to generate local gradients for a federated learning task;
to calculate a gradient Sum-Power level based on the local gradients;
to receive a mapping between gradient Sum-Power levels and scaling factors for channel inversion coefficients to process a data block into an unencoded uplink signal;
to determine a channel inversion coefficient based on a scaling factor obtained from the mapping and the calculated gradient Sum-Power level;
to apply analog modulation and the channel inversion coefficient to the data block to form the unencoded uplink signal; and
to transmit, to a network, the unencoded uplink signal on shared uplink resources for an over-the-air computation of global gradients for the federated learning task.

18. The apparatus of clause 17, in which the mapping is associated with the federated learning task.

19. The apparatus of clause 18, in which the mapping comprises a range of Sum-Power levels assigned to each of the scaling factors.

20. The apparatus of clause 19, in which the federated learning task comprises a training task with a number of gradients, the number of gradients exceeding a threshold, increasing the range of Sum-Power levels assigned to each of the scaling factors.

21. The apparatus of any of the preceding clauses, in which the mapping is defined telecommunications standard.

22. The apparatus of any of the preceding clauses, in which the processor causes the apparatus:
to receive a configuration for reporting the calculated gradient Sum-Power associated with a round of gradient over-the-air aggregation; and
to report the calculated gradient Sum-Power based on the configuration.

23. The apparatus of clause 22, in which the processor causes the apparatus to receive the configuration via a UE-specific downlink channel.

24. The apparatus of clauses 22 or 23, in which the processor causes the apparatus to receive the configuration via a group-common downlink channel.

25. The apparatus of clauses 22-24, in which the configuration indicates a quantization level for reporting the calculated gradient Sum-Power.

26. The apparatus of clauses 22-25, in which the configuration comprises an allocation of uplink resources for the reporting.

27. The apparatus of clauses 22-26, in which the configuration corresponds to a plurality of rounds of the gradient over-the-air aggregation.

28. The apparatus of clause 27, in which the plurality of rounds comprise the overall federated learning task.

29. The apparatus of clauses 22-28, in which the processor causes the apparatus to report via a UE-specific uplink channel.

30. The apparatus of any of the preceding clauses, in which the processor causes the apparatus to receive the mapping via a group-common downlink channel associated with a selected gradient Sum-Power.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    generating local gradients for a federated learning task;
    calculating a gradient Sum-Power level based on the local gradients;
    receiving a mapping between gradient Sum-Power levels and scaling factors for channel inversion coefficients to process a data block into an unencoded uplink signal;
    determining a channel inversion coefficient based on a scaling factor obtained from the mapping and the calculated gradient Sum-Power level;
    applying analog modulation and the channel inversion coefficient to the data block to form the unencoded uplink signal; and
    transmitting, to a network, the unencoded uplink signal on shared uplink resources for an over-the-air computation of global gradients for the federated learning task.

2. The method of claim 1, in which the mapping is associated with the federated learning task.

3. The method of claim 2, in which the mapping comprises a range of Sum-Power levels assigned to each of the scaling factors.

4. The method of claim 3, in which the federated learning task comprises a training task with a number of gradients, the number of gradients exceeding a threshold causing an increase of the range of Sum-Power levels assigned to each of the scaling factors.

5. The method of claim 1, in which the mapping is defined in a telecommunications standard.

6. The method of claim 1 further comprising:
    receiving a configuration for reporting the calculated gradient Sum-Power associated with a round of gradient over-the-air aggregation; and
    reporting the calculated gradient Sum-Power based on the configuration.

7. The method of claim 6, in which receiving the configuration occurs via a UE-specific downlink channel.

8. The method of claim 6, in which receiving the configuration occurs via a group-common downlink channel.

9. The method of claim 6, in which the configuration indicates a quantization level for reporting the calculated gradient Sum-Power.

10. The method of claim 6, in which the configuration comprises an allocation of uplink resources for the reporting.

11. The method of claim 6, in which the configuration corresponds to a plurality of rounds of the gradient over-the-air aggregation.

12. The method of claim 11, in which the plurality of rounds comprise the overall federated learning task.

13. The method of claim 6, in which the reporting occurs via a UE-specific uplink channel.

14. The method of claim 1, in which receiving the mapping occurs via a group-common downlink channel associated with a selected gradient Sum-Power.

15. The method of claim 14, in which the scaling factor corresponds to a reference signal received power (RSRP) value associated with the channel inversion coefficient.

16. The method of claim 15, further comprising receiving the scaling factor along with a message triggering a reference signal associated with the RSRP value.

17. An apparatus for wireless communications performed by a user equipment (UE), comprising:
    a processor,
    memory coupled with the processor; and
    instructions stored in the memory and operable, when executed by the processor, to cause the apparatus:
        to generate local gradients for a federated learning task;
        to calculate a gradient Sum-Power level based on the local gradients;
        to receive a mapping between gradient Sum-Power levels and scaling factors for channel inversion coefficients to process a data block into an unencoded uplink signal;
        to determine a channel inversion coefficient based on a scaling factor obtained from the mapping and the calculated gradient Sum-Power level;

to apply analog modulation and the channel inversion coefficient to the data block to form the unencoded uplink signal; and to transmit, to a network, the unencoded uplink signal on shared uplink resources for an over-the-air computation of global gradients for the federated learning task.

18. The apparatus of claim 17, in which the mapping is associated with the federated learning task.

19. The apparatus of claim 18, in which the mapping comprises a range of Sum-Power levels assigned to each of the scaling factors.

20. The apparatus of claim 19, in which the federated learning task comprises a training task with a number of gradients, the number of gradients exceeding a threshold causing an increase of the range of Sum-Power levels assigned to each of the scaling factors.

21. The apparatus of claim 17, in which the mapping is defined in a telecommunications standard.

22. The apparatus of claim 17, in which the processor causes the apparatus:

to receive a configuration for reporting the calculated gradient Sum-Power associated with a round of gradient over-the-air aggregation; and to report the calculated gradient Sum-Power based on the configuration.

23. The apparatus of claim 22, in which the processor causes the apparatus to receive the configuration via a UE-specific downlink channel.

24. The apparatus of claim 22, in which the processor causes the apparatus to receive the configuration via a group-common downlink channel.

25. The apparatus of claim 22, in which the configuration indicates a quantization level for reporting the calculated gradient Sum-Power.

26. The apparatus of claim 22, in which the configuration comprises an allocation of uplink resources for the reporting.

27. The apparatus of claim 22, in which the configuration corresponds to a plurality of rounds of the gradient over-the-air aggregation.

28. The apparatus of claim 27, in which the plurality of rounds comprise the overall federated learning task.

29. The apparatus of claim 22, in which the processor causes the apparatus to report via a UE-specific uplink channel.

30. The apparatus of claim 17, in which the processor causes the apparatus to receive the mapping via a group-common downlink channel associated with a selected gradient Sum-Power.

\* \* \* \* \*